May 30, 1961   C. L. BARR   2,986,215
SALT WATER DISPOSAL SYSTEM
Filed Sept. 23, 1958
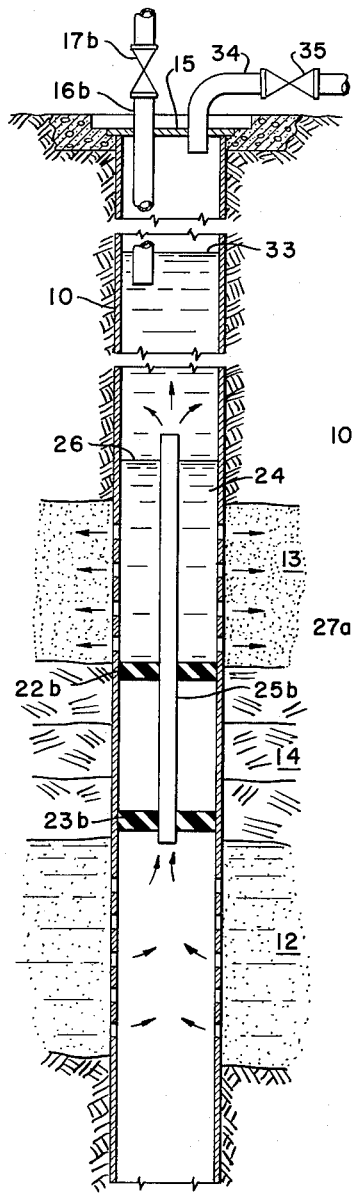
FIG. 2
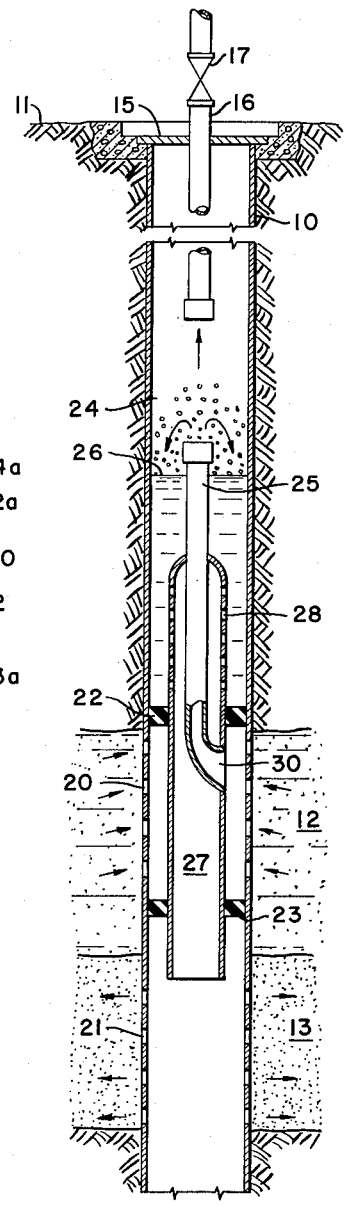
FIG. 3
FIG. 1
INVENTOR:
CLIFFORD L. BARR
BY: *J. H. McCarthy*
HIS AGENT

United States Patent Office 2,986,215
Patented May 30, 1961

2,986,215
SALT WATER DISPOSAL SYSTEM
Clifford L. Barr, Metairie, La., assignor to Shell Oil Company, a corporation of Delaware
Filed Sept. 23, 1958, Ser. No. 762,831
4 Claims. (Cl. 166—67)

This invention relates to apparatus for use in oil and gas wells and pertains more particularly to apparatus which is adapted to be positioned in a well for disposing of water, particularly salt water, which may be produced with the oil and/or gas being produced from the well.

The production fluid from a well may be oil, gas or water or any combination of these substances. In most oil or gas producing wells, varying amounts of water, usually salt water, are produced with the oil or gas. In some instances the water is produced together with a mixture of both oil and gas. General practice is to flow the hydrocarbon fluid together with water to the surface where the water is separated from the hydrocarbon fluid and later pumped into a disposal well.

While there is little additional cost in producing water along with gas and/or oil from a flowing well, it is quite apparent that apparatus for disposing of this water at the surface may constitute a considerable investment in money, especially if the water has to be reinjected through anoher well into a porous formation that will accept the water.

It is therefore an object of the present invention to provide apparatus to be positioned in a well for disposing of water produced by the well thereby eliminating need for separate water handling and disposal facilities at the surface.

Another object of the present invention is to provide apparatus for disposing of water within a well thereby prolonging the flowing life of the well through increased flowing pressures resulting from the downhole removal of the water from the flowing stream of production fluid.

A further object of the present invention is to provide apparatus for disposing of water within a well drilled in a water-drive reservoir, thereby deferring or eliminating need for compression facilities which would be normally needed as the reservoir was depleted.

Another object of this invention is to provide apparatus within a well for disposing of water produced by the well into a porous zone or formation either above or below the producing formation.

Still another object of the present invention is to provide apparatus within a well for disposing of water produced by the well while at the same time maintaining a substantially constant pressure within the well.

A further object of this invention is to provide simple and inexpensive apparatus adapted to be fixedly or removably positioned within a well and which, if removable, may be readily withdrawn from the well at any time.

These and other objects of this invention will be understood from the following description taken with reference to the drawing, wherein:

Figure 1 is a diagrammatic view, taken in longitudinal cross-section, of the apparatus of the present invention positioned in a well where a water disposal zone is located below the hydrocarbon-and-water producing formation.

Figure 2 is a diagrammatic view, taken in longitudinal cross-section, of another arrangement of apparatus of the present invention positioned in a well wherein the porous water-disposal zone is positioned above hydrocarbon-and-water producing formation.

Figure 3 is a diagrammatic view, taken in longitudinal cross-section, of an alternative arrangement of conduits extending through well packers which may be employed in place of the arrangement shown in Figure 1.

Referring to Figure 1 of the drawing, the well is illustrated as containing a well casing 10 which extends from above the surface of the earth 11 downwardly through a hydrocarbon-and-water producing formation 12 as well as through a porous formation 13 which is adapted to receive water or salt water by injection. The porous water-disposal formation 13 may be located several hundred feet below the producing formation 12 in some oil or gas fields, while in other fields it may be positioned adjacent the producing formation or even form part of the producing formation, the lower part. Since water is heavier than hydrocarbon fluids, water may be reinjected into the bottom of a reservoir of the water-drive type, while oil or gas is being produced along with some water from the upper part of the producing formation. This is especially true when the producing formation extends over a depth of a hundred feet or more.

As shown in Figure 2 of the drawing, in many oil fields there may be a porous formation 13 above the producing formation 12, which porous formation will readily accept water. Additionally, as shown in Figure 2, there is often a layer of shale or other impermeable material 14 positioned between the producing formation 12 and the water-disposal formation 13 which would prevent the migration of water from one zone to another.

The well casing 10 of Figure 1 is shown as being closed at the top by suitable closure means which are diagrammatically represented as by a plate 15, but in practice is normally in the form of a well-head assembly which serves to close the top of the well casing while providing a production conduit 16 for conveying fluids from the well. In the present apparatus, which is to be employed only in wells that are flowing under pressure, a valve 17, preferably of the choke type, is provided in the production conduit 16 for selectively controlling the flow of hydrocarbon fluid through the production line 16 while maintaining a back pressure at all times within the well casing 10. The inlet end of the production conduit 16 within the well casing 10 is open at all times and is either flush with the casing closure 15 or extends downwardly into the well, as desired, as long as it is within the volume of hydrocarbon fluid within the well.

The well casing 10 of Figure 1 has been perforated so that it is provided with a series of perforations 20 at a level adjacent the producing zone and preferably just above the water level thereof, and a second set of perforations 21 opposite the porous formation through which water is to be reinjected into the formation 13.

A first transverse closure 22 is set in fluidtight engagement with the inner wall of the well casing 10 at a point above the perforations 20 opposite the producing formation, while a second transverse closure 23 is positioned in the well casing 10 preferably at a point opposite the top of the water level within the producing formation. While the closures 22 and 23 are preferably in the form of well packers which may be readily set or removed from the well casing 10 after the casing 10 is in place, it is realized that the closures 22 and 23 may be in the form of plates of metal or other material which may be fastened in fluidtight engagement within the well casing prior to setting the casing in place.

Extending through the upper closure 22 into the chamber or reservoir 24 formed thereabove is a production standpipe 25 of the size capable of handling the flow of water and hydrocarbon fluid from the producing formation 12. The production standpipe 25 is preferably secured to the closure 22 in a readily removable fashion so that it may be easily removed from the surface by suitable tools when it is desired to change the length of the standpipe 25. The length of the standpipe 25 is selected so that the open upper end of the standpipe is above the water level 26 within the well casing 10. The precise length of the standpipe 25 depends upon many factors, such for example, as the pressure of the well, the pressure necessary to inject water into the porous formation 13, the pressure at which hydrocarbon fluid is being produced through the production conduit 16, etc.

Concentrically positioned from the lower part of the production standpipe 25 and extending downwardly through both closures 22 and 23 is a water disposal conduit 27 having suitable fluid inlet ports 28 in the upper end thereof above closure 22 for admitting water thereto. A flow passage 30 extends through the wall of the disposal conduit 27 at a point opposite the producing formation 12 but communicates only with the lower end of the production standpipe 25. Thus the conduits 25 and 27 mounted concentrically and extending through packer 12 form what is commonly known in the oil field art as a cross-over choke wherein fluid within the annulus between the conduit 27 and the well casing 10 below closure 22 moves to conduit 25 in the center of the well casing above closure 22, while fluid in the annulus between conduit 25 and well casing 10 above closure 22 moves downwardly into the axially disposed conduit 27 below the packer 22.

It is evident that instead of employing the concentric conduits 27 and 25 an arrangement of conduits may be employed as shown in Figure 3. In this arrangement a pair of packers 23a and 22a are mounted on a production standpipe 25a for ease of placement within the well casing 10. The production standpipe 25a is closed at the lower end as by a cap 31 and is provided with fluid inlet ports 32 near its lower end below the upper packer 22a. Extending through both upper and lower packers 22a and 23a and in open communication at all times between the space at the bottom of chamber 24a and with the space below packer 23a is a water disposal conduit 27a. The combination of the conduits 25a and 27a operates exactly the same as the concentric conduits 25 and 27 of Figure 1.

Referring to Figure 2 of the drawing, the present apparatus is shown as being positioned in a well casing 10 which traverses the porous formation 13 which is located above the producing formation 12, rather than below it as shown in Figure 1. A first transverse closure 22b is positioned in the well casing 10 at a level substantially opposite the bottom of the porous formation 13, while the second transverse closure 23b is positioned between the producing formation 12 and the porous formation 13. If desired, in some installations the closure means 22b and 23b may be combined to form a single closure positioned between the two formations 12 and 13.

As shown, a production standpipe 25b extends upwardly through the closures 22b and 23b to a height above the water line 26 in the well casing 10, so that the space above the water line 26 is in open communication at all times with the well casing below the closure 23b. In this well installation the well casing 10 serves as the water disposal conduit for conveying the water to the porous formation 13.

In the event that the producing formation 12 of Figure 2 produces oil, gas and water combined, an oil level 33 would be formed in the upper part of the well casing. In this case the production conduit 16b would extend downwardly into the well casing 10 a distance sufficient to position the lower end of the production conduit 16b at all times below the oil level 33 in the casing 10. At the same time the closure 15 at the top of the well casing 10 would be provided with a gas outlet line 34 having a choke valve therein for controlling the flow of gas while at the same time maintaining a back pressure on the liquids within the well casing 10. Alternatively both oil and gas can be produced through the tubing and the well could be controlled by a single choke in a more conventional fashion.

In the operation of the apparatus of Figure 1, the hydrocarbon fluids such as gas, and water are forced under pressure from the producing formation 12 through perforations 20 into the well casing 10 between packers 22 and 23. The combined production fluid then enters port 30 and rises vertically in the production standpipe 25. Even though the perforations 20 may be set above the water level in the adjacent producing formation, a certain amount of water generally mixes with the gas due to a coning action which takes place around the well casing 10. As the mixture of gas and water are discharged from the open upper end of the production standpipe 25, the gas-water mixture is expanded into the full diameter of the well casing 10, thus sharply reducing the velocity of the fluid stream. This velocity reduction allows the water phase of the production fluid to drop out into the reservoir 24 while the gas phase continues to move upwardly in the well casing 10, entering the open end of the production conduits 16 to be conveyed out of the well when valve 17 is opened. Water falling into the annular reservoir 24 surrounding the production standpipe 25 flows downwardly through ports 28 into the water disposal conduit 27 to be discharged from the lower end thereof into the well casing 10 adjacent the porous formation 13 where the well casing 10 is perforated.

Depending upon the pressure of the porous formation 13, the water either flows into the formation 13 at once or at a time when sufficient pressure has built up within the well casing to force it into the formation. Pressure is generated within the well casing 10 by the buildup of a hydrostatic head of liquid within the annular reservoir 24. This fluid head, when combined with the pressure of the gas within the well tubing above the water level 26, which may be regulated by adjustment of the choke valve 17 in the production conduit 16, is sufficient to force the water into the porous formation 13, even though the porous formation may form the lower part of the producing formation. In many well installations the pressure on the downstream side of the choke valve 17 is at the pressure at which the gas is being sold to a pipe line, generally about 1000 pounds pressure, with the pressure within the well being higher than that. It may therefore be seen that sufficient pressure can be readily built up within the well casing to overcome any pressures within the porous formation 13 where the disposal of the water is taking place. The pressure within the reservoir section 24 is equal to the bottomhole pressure of the well minus the head loss of the production standpipe 25. The total injection pressure available for disposing of the water in the porous zone 13 is equal to the pressure generated by the hydrostatic head of fluid in the annular reservoir 13 plus the gas pressure thereabove. In certain installations where the gas pressure is relatively low the production standpipe 25 may be lengthened so that a greater head of fluid is available in the annular reservoir 24 for injecting the water into the porous formation 13.

When using the arrangement illustrated in Figure 3 in the system shown in Figure 1, the mixture of gas and water would pass upwardly through production standpipe 25a while the water from reservoir 24a would flow downwardly through the water disposal conduit 27a. While the above system has been described with regard to the disposal of water being produced with gas, it is realized that the system could be employed when the production fluid is a mixture of oil and water.

When the production fluid is a mixture of oil, gas and water, an oil production conduit 16b (Figure 2) would be needed as well as a gas outlet line 34. The gas pressure in the well casing 10, maintained by adjustment of the choke valve 35, not only aids in forcing the waste water into the porous formation 13, but also furnishes the pressure for forcing the oil upwardly out of the production conduits 16b.

In the system illustrated in Figure 2, the mixture of oil, gas and water being produced from formation 12 is forced upwardly into pressure of the formation through the production standpipe 25b where it is discharged above the open end thereof into the full diameter of the well casing 10. The water being heavier drops out while both the gas and the oil rise, the gas being trapped at the top of the well casing by the closure 15. While maintaining the pressure within the well casing a selected value, water is forced into the porous formation 13 while at the same time oil is produced through conduit 16b while gas is produced through conduit 34.

I claim as my invention:

1. Apparatus adapted to be used in flowing oil and gas-producing wells which simultaneously produce unwanted volumes of water, said well traversing a hydrocarbon-and-water producing formation and a porous formation adapted to form a water-disposal formation, said apparatus comprising a well casing in said well, first closure means closing the top of said casing, said casing extending at least below a hydrocarbon-and-water producing formation traversed by said well, said well casing having fluid port means in communication with said producing formation, second casing closure means positioned in said well casing above said hydrocarbon-and-water producing formation whereby a reservoir chamber is formed above said second closure means in said casing, third casing closure means positioned in said well casing intermediate the producing formation and the water-disposal formation, an open-ended standpipe fixedly mounted in said casing and extending between a point in said casing in open communication with said producing formation and a point in said reservoir chamber at a height at least above the level of the interface between the water and a hydrocarbon fluid in said reservoir chamber for conducting said hydrocarbon-and-water production fluid under pressure to said reservoir chamber, conduit means in open communication at all times between the lower portion of said reservoir chamber and the water-disposal formation, fluid-discharge conduit means extending through said first closure means at the top of said well casing in open communication at all times with the upper end of said reservoir chamber, and choke-valve means in said fluid-discharge conduit means selectively set to control the flow of fluid therethrough while maintaining a back-pressure on said reservoir chamber.

2. Apparatus adapted to be used in flowing oil and gas-producing wells which simultaneously produce unwanted volumes of water, said well traversing a hydrocarbon-and-water producing formation and a porous formation adapted to form a water-disposal formation, said apparatus comprising a well casing in said well, well-head closure means closing the top of said casing, said casing extending at least below a hydrocarbon-and-water producing formation traversed by said well, said well casing having perforations therein adjacent said producing and said disposal formations, first packer means positioned in said well casing above the perforations adjacent said hydrocarbon-and-water producing formation whereby a reservoir chamber is formed above said first packer means in said casing, second packer means positioned in said well casing intermediate the producing formation and the water disposal formation, a standpipe open at both ends extending upwardly through said first packer means into said reservoir chamber to a height at least above the level of the interface between the water and a hydrocarbon fluid in said reservoir chamber for conducting said hydrocarbon-and-water production fluid under pressure to said reservoir chamber, conduit means in open communication at all times between a point near the bottom of said reservoir chamber and the water-disposal formation, fluid-discharge conduit means extending through said well-head closure means at the top of said well casing in open communication at all times with the upper end of said reservoir chamber, and choke-valve means in said fluid-discharge conduit means selectively set to control the flow of fluid therethrough while maintaining a back-pressure on said reservoir chamber.

3. Apparatus adapted to be used in flowing oil and gas-producing wells which simultaneously produce unwanted volumes of water, said well traversing a hydrocarbon-and-water producing formation and a porous formation adapted to form a water-disposal formation positioned above said producing formation, said apparatus comprising a well casing in said well, first closure means closing the top of said casing, said casing extending at least below a hydrocarbon-and-water producing formation traversed by said well, said well casing having perforations therein adjacent said producing and said disposal formations, second casing closure means positioned in said well casing above said hydrocarbon-and-water producing formation whereby a reservoir chamber is formed above said second closure means in said casing at a level adjacent and above the perforations in the well casing opposite the porous disposal formation, said second casing closure means being positioned in said well casing intermediate the producing formation and the water disposal formation, a standpipe open at both ends extending upwardly through said second casing closure means into said reservoir chamber to a height at least above the level of the interface between the water and a hydrocarbon fluid in said reservoir chamber for conducting said hydrocarbon-and-water production fluid under pressure to said reservoir chamber, said perforations being in open communication at all times between the lower portion of said reservoir chamber and the water disposal formation, fluid-discharge conduit means extending through said first closure means at the top of said well casing in open communication at all times with the upper end of said reservoir chamber, and choke valve means in said fluid-discharge conduit means selectively set to control the flow of fluid therethrough while maintaining a back-pressure on said reservoir chamber.

4. Apparatus adapted to be used in flowing oil and gas-producing wells which simultaneously produce unwanted volumes of water, said well traversing a hydrocarbon-and-water producing formation and a porous formation adapted to form a water-disposal formation positioned above said producing formation, said apparatus comprising a well casing in said well, first closure means closing the top of said casing, said casing extending at least below a hydrocarbon-and-water producing formation traversed by said well, said well casing having perforations therein adjacent said producing and said disposal formation, second casing closure means positioned in said well casing above said hydrocarbon-and-water producing formation whereby a reservoir chamber is formed above said second closure means in said casing at a level adjacent and above the perforations in the well casing opposite the porous disposal formation, said second casing closure means being positioned in said well casing intermediate the producing formation and the water disposal formation, a standpipe open at both ends extending upwardly through said second casing closure means into said reservoir chamber to a height at least above the level of the interface between the water and a hydrocarbon fluid in said reservoir chamber for conducting said hydrocarbon-and-water production fluid under pressure to said reservoir chamber, said perforations being in open communication at all times between the lower portion of said reservoir chamber and the water disposal formation, gas-discharge conduit means extending through said first closure means at the top of said well casing in open communication at all times with the top end of said reservoir chamber, choke-valve means in said gas-discharge conduit means selectively set to control the flow of gas therethrough while maintaining a back-pressure on said reservoir chamber, an oil discharge line extending through said first closure means at the top of said well and extending down into said reservoir chamber to a point above the top of the standpipe therein, said discharge line being in open communication at all times with said reservoir chamber, and valve means in the oil discharge line for controlling the flow therethrough.

References Cited in the file of this patent

UNITED STATES PATENTS

| | | |
|---|---|---|
| 1,649,524 | Hammond | Nov. 15, 1927 |
| 2,214,064 | Niles | Sept. 10, 1940 |
| 2,762,437 | Egan et al. | Sept. 11, 1956 |